United States Patent [19]
Anderson

[11] Patent Number: 5,529,091
[45] Date of Patent: Jun. 25, 1996

[54] CHECK VALVE

[75] Inventor: Alan C. Anderson, Painted Post, N.Y.

[73] Assignee: Dresser-Rand Company, Corning, N.Y.

[21] Appl. No.: 490,369

[22] Filed: Jun. 14, 1995

[51] Int. Cl.$^6$ ................................................ F16K 15/04
[52] U.S. Cl. .................... 137/513.7; 137/516.25
[58] Field of Search ..................... 137/513.7, 516–25, 137/533.11, 533.13, 533.15, 519.5

[56] References Cited

U.S. PATENT DOCUMENTS

| | | | |
|---|---|---|---|
| 3,085,589 | 4/1963 | Sands | 137/516.25 X |
| 4,030,520 | 6/1977 | Sands | 137/513.7 X |
| 4,531,543 | 7/1985 | Markley | 137/516.25 X |

Primary Examiner—Robert G. Nilson
Attorney, Agent, or Firm—Bernard J. Murphy

[57] ABSTRACT

A body, having ported plates astride a third plate having a void formed therein, confines a ball-type valving element therein, in a chamber defined by the void. Ports in the ported plates open onto the chamber, and the ported plate on the outlet side of the valve further has a metering orifice formed therein which opens onto the chamber. Fluid flow proceeds from the plate on the inlet side, through the chamber, and out through the metering orifice. The configuration, for a given fluid having a prescribed forward pressure differential, controls the flow rate. Additionally, the pressure differential securely holds the valving element on its valve-open seat, and substantially diminishes false closing and ball chatter.

9 Claims, 1 Drawing Sheet

CHECK VALVE

This invention pertains to one-way fluid valves, i.e., check valves, and in particular to a novel check valve having a metering orifice.

Check valves, especially ball-type check valves are well known in the prior art. However, there's a need for a ball-type check valve, for instance, in which the flow rate therethrough, for a given forward pressure differential can be controlled. Too, it is desirable to have a check valve in which, when the valve is in its open position, the pressure differential of the fluid flow holds the valving element, i.e., the ball or other, on its opened-position seat. The latter feature will reduce or wholly eliminate false closing of the valve and ball chatter.

It is an object of this invention, then, to set forth a check valve of novel construction which satisfies the aforesaid needs.

Particularly, it is an object of this invention to disclose a check valve comprising a body having a chamber formed therein; a first port, formed in said body at one side thereof, opening onto said chamber; a second port, formed in said body at the opposite side thereof, opening onto said chamber; means movably disposed in said chamber (a) responsive to fluid pressure addressed to said first port for closing off said second port from said chamber, and (b) responsive to fluid pressure addressed to said second port for closing off said first port from said chamber; and metering means formed in one of said sides of said body for conducting fluid out of said chamber when one of said first and second ports is closed to said chamber.

Further objects of this invention, as well as the novel features thereof will become apparent by reference to the following description, taken in conjunction with the accompanying figures, in which.

Figure 1:
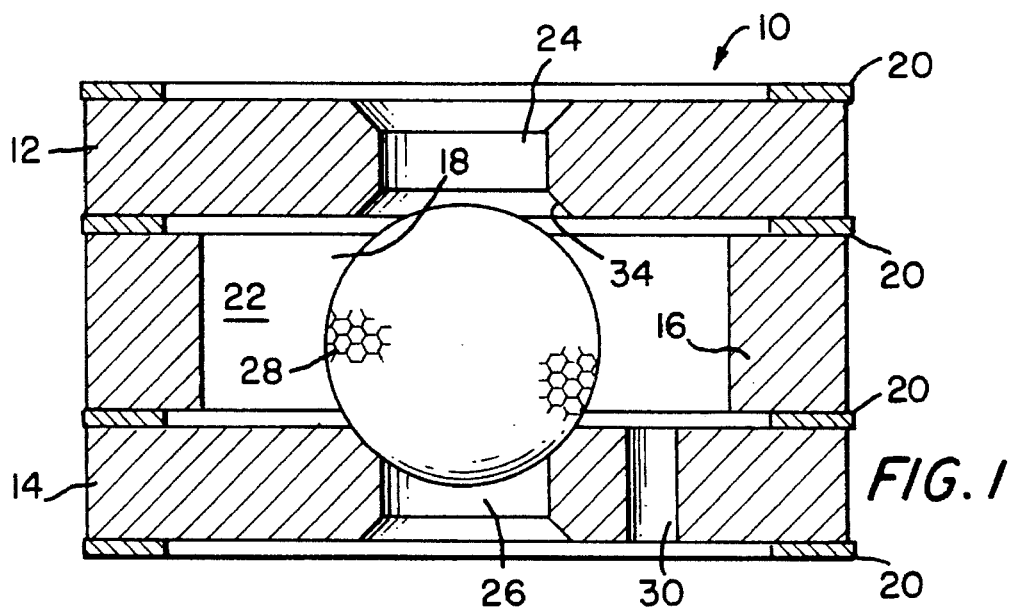
FIG. 1 is a cross-sectional view of the novel check valve, according to an embodiment thereof, in the open position.
Figure 2:
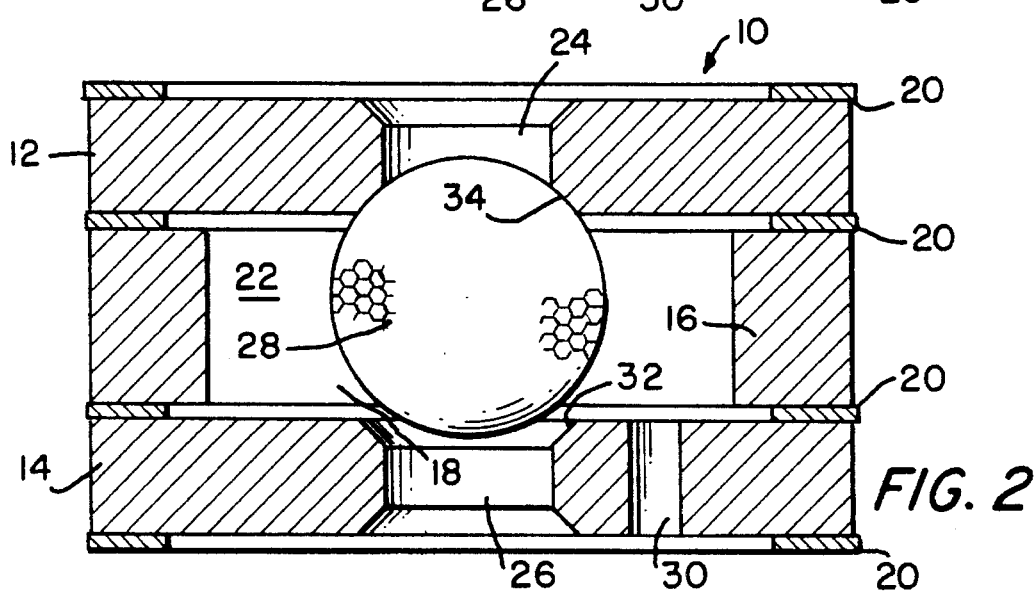
FIG. 2 is a view like that of FIG. 1, showing the valve in its closed position.

As shown in FIGS. 1 and 2, the novel valve 10 comprises a pair of ported plates 12 and 14 which have a third plate 16, the latter having a void 18 formed therein, interposed therebetween. Spacers 20 are set between the plates, and outermost ones thereof are provided for spacing-off from intercoupling fluid conduits or lines (not shown). The void 18 comprises an inner chamber 22 of the valve 10, and the ports 24 and 26, in the plates 12 and 14, respectively, open onto the chamber 22. A spherical or ball-type valving element 28 is captive in the chamber 22, interpositioned between the ports 24 and 26.

Plate 14 further has a metering orifice 30 formed therein which opens onto the chamber 22. As can be seen, orifice 30 has a diameter significantly smaller than the diameters of ports 24 and 26. For a given forward pressure differential, between the pressure entering port 24 and exiting via the orifice 30, as occurs when the valve 10 is in the FIG. 1 configuration, the flow rate is positively controlled. Too, the pressure differential, arising from the flow of the fluid through port 24 and orifice 30, firmly holds the element 28 on the seat 32 of port 26. Too, this substantially insures that any false closing of the valve 10 will not occur, and ball chatter is substantially eliminated.

When the fluid pressure at port 26 is greater than that at port 24, the element 28 is forced onto the seat 34 of port 24 and, thus, the fluid flow is checked. This configuration of the valve 10 is shown in FIG. 2.

Figure 3:
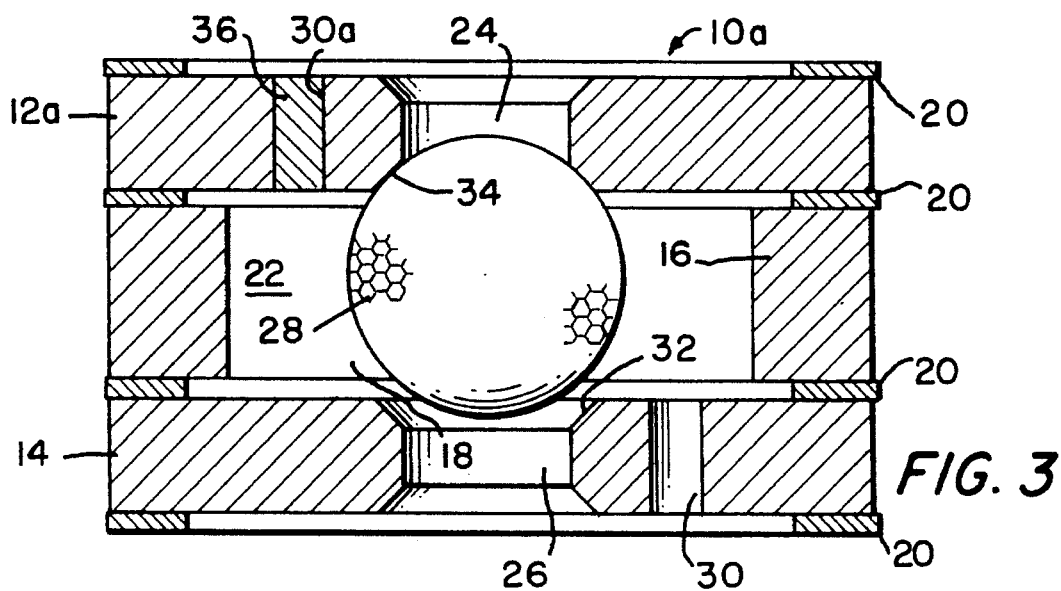
FIG. 3 is a view similar to that of FIG. 2 showing an alterative embodiment of the invention.

FIG. 3 depicts an alternative embodiment 10a of the valve in which same or similar components have same or similar index numbers. Herein, plates 12a and 14 are identical, except that the orifice 30a in plate 12a is closed off with plug 36. Simply, if it is deemed useful, from the point of view of simplifying stocking of parts, only plates 12a need be made and stocked. Then, on fabricating a valve, the plug 36 can be left in place in the plate if it is to serve as an inlet plate, or can be expelled if it is to be an outlet plate.

While I have described my invention, in connection with specific embodiments 10 and 10a thereof, it is to be clearly understood that this is done only by way of example, and not as a limitation to the scope of the invention as set forth in the objects thereof and in the appended claims.

I claim:

1. A check valve, comprising:

a body having a chamber formed therein;

a first port, formed in said body at one side thereof, opening onto said chamber;

a second port, formed in said body at the opposite side thereof, opening onto said chamber;

means movably disposed in said chamber (a) responsive to fluid pressure addressed to said first port for closing off said second port from said chamber, and (b) responsive to fluid pressure addressed to said second port for closing off said first port from said chamber; and metering means formed in one of said sides of said body for conducting fluid out of said chamber when one of said first and second ports is closed to said chamber; wherein;

said body comprises a pair of ported plates, and a third plate having a void formed therein interposed between said ported plates.

2. A check valve, according to claim 1, wherein:

said means movably disposed in said chamber comprises a valving element.

3. A check valve, according to claim 2, wherein:

said valving element is freely disposed in said chamber.

4. A check valve, according to claim 1, wherein:

said first and second ports each have a valve seat within said chamber; and said means movably disposed in said chamber comprises a spherical valving element movable onto and from said seats.

5. A check valve, according to claim 1, wherein:

said metering means comprises an opening formed in a side of said body and in fluid communication with said chamber.

6. A check valve, according to claim 1, wherein:

said ported plates are identical.

7. A check valve, according to claim 1, wherein:

said metering means, when said one port is closed to said chamber, is in open fluid communication with the other of said ports.

8. A check valve, according to claim 1, wherein:

said metering means, when said other port is closed to said chamber, is in open fluid communication with said one port.

9. A check valve, according to claim 1, wherein:

said metering means and said one port are both in open fluid communication with said chamber, when said other port is closed to said chamber.

* * * * *